United States Patent [19]

Little et al.

[11] Patent Number: 4,908,790
[45] Date of Patent: Mar. 13, 1990

[54] BACKUP BATTERY SWITCHING CIRCUITRY FOR A MICROCOMPUTER OR A MICROPROCESSOR

[75] Inventors: Wendell L. Little, Carrollton; Stephen N. Grider, Farmers Branch, both of Tex.

[73] Assignee: Dallas Semiconductor Corporation, Dallas, Tex.

[21] Appl. No.: 166,383

[22] Filed: Mar. 10, 1988

[51] Int. Cl.⁴ .......................... G06F 1/00; G11C 7/00
[52] U.S. Cl. ................................. 364/900; 371/66; 307/66; 365/229; 364/943.91; 364/944.2; 364/948.4; 364/946.2
[58] Field of Search ... 364/200 MS File, 900 MS File; 371/66; 307/66; 365/229

[56] References Cited

U.S. PATENT DOCUMENTS

| 4,122,359 | 10/1978 | Breikss | 365/229 |
|---|---|---|---|
| 4,203,153 | 5/1980 | Boyd | 364/200 |
| 4,422,163 | 12/1983 | Oldenkamp | 365/229 |
| 4,458,307 | 7/1984 | McAnlis et al. | 371/66 |
| 4,645,943 | 2/1987 | Smith, Jr. et al. | 307/66 X |
| 4,730,121 | 3/1988 | Lee et al. | 307/66 |
| 4,816,862 | 3/1989 | Taniguchi | 365/229 |

Primary Examiner—Raulfe B. Zache
Assistant Examiner—Florin Munteanu-R.
Attorney, Agent, or Firm—Worsham, Forsythe, Sampels & Wooldridge

[57] ABSTRACT

Backup battery switching circuitry for a microcomputer or a microprocessor includes circuitry for selectively coupling a backup battery to a power supply output terminal of the microcomputer or microprocessor for powering an external circuit such as a static RAM. The backup battery voltage is normally coupled to the power supply output terminal in the absence of a primary power source, but may be isolated from the power supply output terminal when a predetermined voltage is applied to a logic input pin and a predetermined sequence of events is executed by the microcomputer or microprocessor.

4 Claims, 2 Drawing Sheets

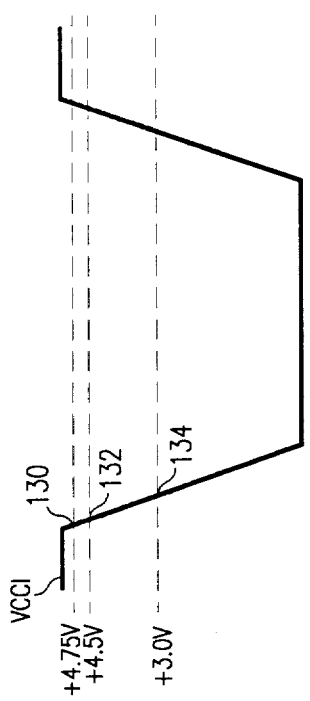
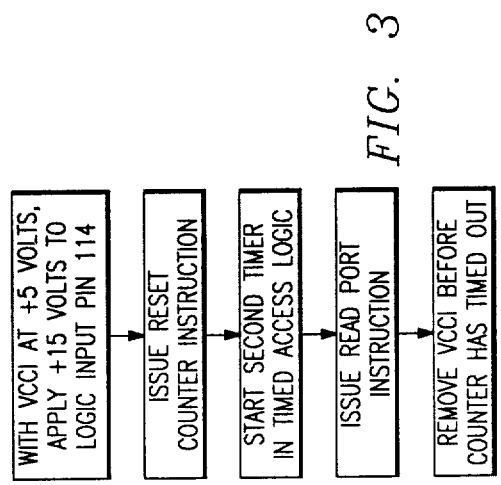
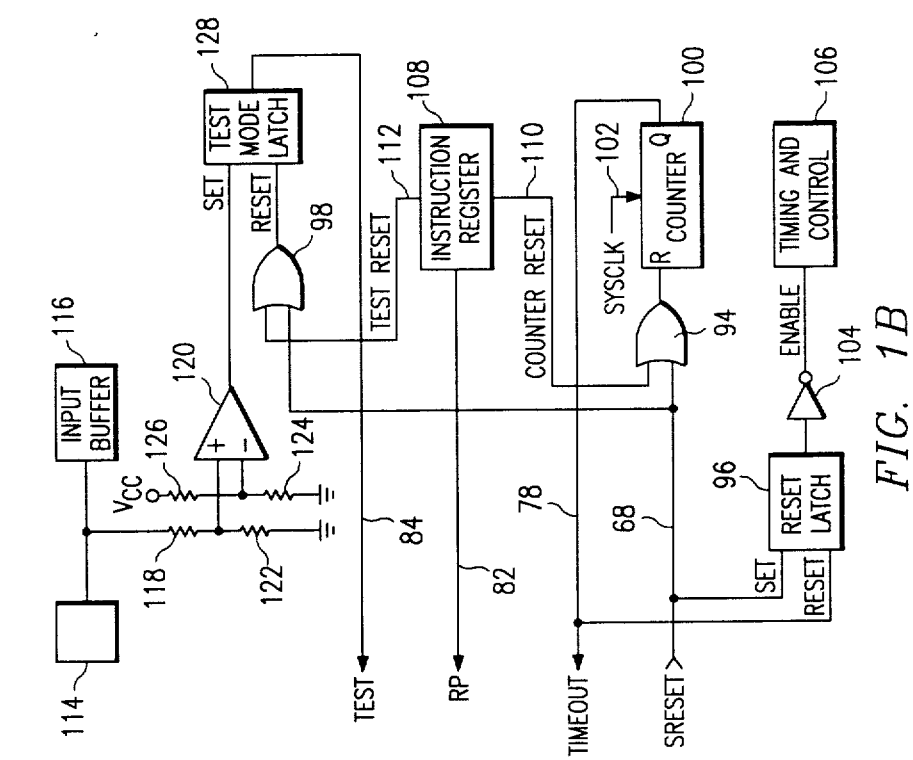

BACKUP BATTERY SWITCHING CIRCUITRY FOR A MICROCOMPUTER OR A MICROPROCESSOR

TECHNICAL FIELD

This invention relates to circuits for controlling power supply voltages on microcomputers or microprocessors, and, more particularly, to circuits for controlling backup battery voltages on microcomputers and microprocessors.

BACKGROUND OF THE INVENTION

Circuits have been developed in the past to provide automatic switching of a primary power supply voltage to a battery powered backup power supply when the primary power source has failed. Generally, the batteries used with these circuits have a limited useful life which is much less than the useful life of the circuit that they are attached to. Therefore, these batteries require periodic checking and maintenance.

Recently, however, long-life lithium energy cells have been developed which have a shelf life of many years. These lithium energy cells are relatively small compared to older battery types; and it is possible to combine a lithium energy cell with a microcomputer and a static random access memory into a dual in-line integrated circuit package. In these circuits, the backup battery provides backup power to both the microcomputer and the static RAM and is able to do so for many years.

However, since the lifetime of these lithium energy cells is limited, it is desirable to reduce the drain on the lithium batteries by removing the battery voltage from the static RAM at times when it is not necessary to preserve the data stored in the static RAM such as, for example, when the part is being stored in inventory prior to the time when it is programmed and actually used.

Therefore, it can be appreciated that a backup battery switching circuit for use in a microcomputer or microprocessor which allows the backup battery to be disconnected from a static RAM when it is desired to restrict the drain on the backup battery is highly desirable.

SUMMARY OF THE INVENTION

It is, therefore, an object of this invention to provide circuitry for selectively coupling a backup battery voltage to a static RAM such that the static RAM can be powered from the backup battery voltage in the absence of a primary power source when it is desired to preserve the data stored in the static RAM and can be isolated from the backup battery voltage when it is desired to reduce the power drain on the backup battery caused by the static RAM.

Shown in an illustrated embodiment of the invention is a microcomputer having a first input terminal for coupling primary power source to the microcomputer, a second input terminal for coupling a backup battery power to the microcomputer and an output terminal for providing power supply voltage to an external circuit such as a static RAM. The microcomputer also includes a comparator for comparing the voltage at the first input terminal to the voltage at the second input terminal. The microcomputer further includes a latch circuit which is placed in a first state when the microcomputer issues a predetermined command sequence and is placed in a second state when a counter in the microcomputer counts a predetermined number of clock cycles of the microcomputer after the counter has been reset. A switching circuit inside the microcomputer couples the second input terminal to the power supply output terminal when the voltage at the second input terminal is greater than the voltage at the first input terminal and the latch circuit is in the second state, and isolates the second input terminal from the power supply output terminal when the voltage at the first input terminal is greater than the voltage at the second input terminal or when the latch circuit is in the first state.

In a further aspect of the invention, the latch circuit switches to the first state only when the microcomputer has received a voltage level at an input terminal which is a voltage level other than a logical 1 level or a logical 0 level.

BRIEF DESCRIPTION OF THE DRAWINGS

The aforementioned and other features, characteristics, advantages, and the invention in general, will be better understood by the following, more detailed description taken in conjunction with the accompanying drawings in which:

FIGS. 1A and 1B are two parts of a schematic diagram of a power controller containing backup battery switching circuitry according to the present invention;

FIG. 2 is a voltage diagram illustrating the trip points of the three comparator circuits shown in FIG. 1A; and FIG. 3 is a flow diagram of the sequence of events required to isolate the backup battery voltage from the power supply output terminal in the preferred embodiment.

Figure 1A:
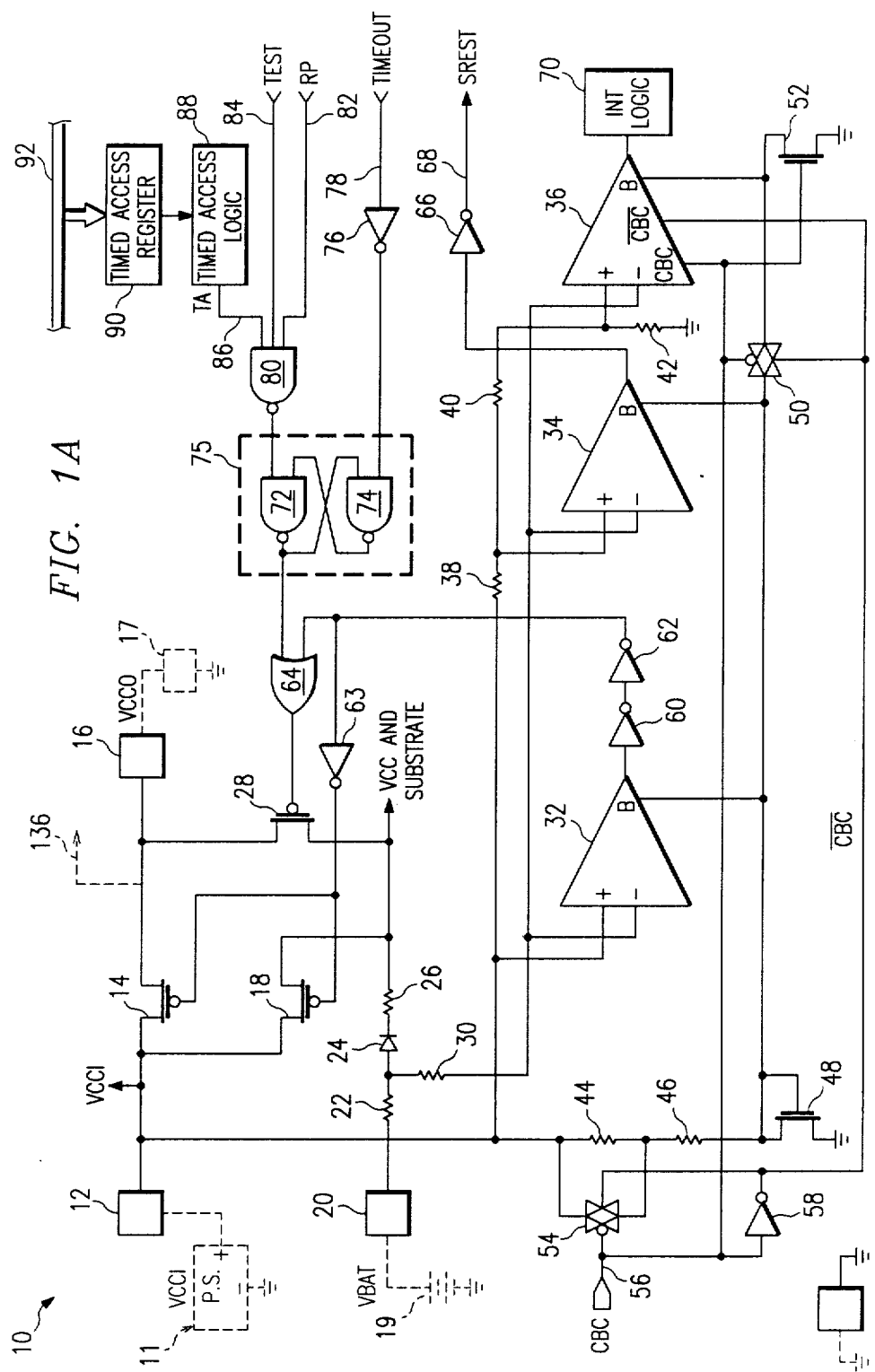

It will be understood that for clarity and where deemed appropriate, reference numerals have been repeated in the figures to show corresponding features.

DESCRIPTION OF THE PREFERRED EMBODIMENT

The backup battery switching circuitry of the present invention can be advantageously used as part of a power controller for a microcomputer or a microprocessor. Although the preferred embodiment is in a microcomputer, it will be understood that the present invention is applicable also to a microprocessor. The microcomputer has a primary power source input terminal, a backup battery input terminal, and a power supply output terminal which can be connected to a separate circuit such as a static RAM.

The power controller includes a comparator for comparing the primary power source voltage to the backup battery voltage. If the primary power source voltage is greater than the backup battery voltage, the comparator enables, or makes conductive, a first switching transistor to form an electrical path between the primary power source input terminal and the power supply output terminal, and disables, or makes nonconductive, a second switching coupled between the backup battery input terminal and the power supply output terminal. If the primary power source voltage is less than the backup battery voltage, then the first switching transistor is disabled. Under these conditions the second switching transistor is enabled if the output of a RAM Battery Power (RBP) latch is at a logical 0 level, and disabled if the output of the RBP latch is a logical 2 level.

The output of the RBP latch is set to a logical 1 level when the output of a NAND gate, connected to the SET input of the RBP latch, is also at a logical 0 level. This NAND gate has three inputs which must all be at a logical 1 level to provide a logical 0 level at the output of the NAND gate. These three inputs are as follows: (1) A Timed Access (TA) signal line generated by timed access circuitry in the microcomputer, the TA signal line being at a logical 1 level for a predetermined period of time after appropriate instructions have been issued to the timed access circuitry; (2) a TEST signal line which becomes a logical 1 level when the microcomputer is placed in a test mode by applying a specific voltage level to a specified input pin of the microcomputer which is outside the range of the normal logical 1 and logical 0 voltage levels; and (3) a Read Port (RP) signal line which becomes a logical 1 level when a RP instruction is executed by the microcomputer.

The RBP latch output is reset to a logical 0 level when the output of a counter circuit on the microcomputer becomes a logical 1 level which occurs when the counter has counted a predetermined number (approximately 1700) clock cycles of the microcomputer.

When it is desired to isolate the backup battery from the power supply output terminal in order to lessen the drain on the backup battery, such as when the microcomputer is to be stored for a period of time and the data stored in the static RAM connected to the power supply output terminal does not need to be saved, the following sequence of operations is executed to set the output of the RBP latch to a logical 1 level:

(1) With the microcomputer powered by the primary power source the microcomputer is placed in the test mode by applying a voltage of +12 to +15 volts to the specified input pin of the microcomputer;

(2) Causing the microcomputer to execute an instruction to reset the counter;

(3) Causing the microcomputer to execute the necessary instructions to enter the timed access mode to provide a logical 1 level on the TA signal line;

(4) Causing the microcomputer to issue a port read instruction; and (5) Removing the primary power source voltage before the counter circuit has reset the RBP latch.

The RBP latch is reset whenever the primary power source voltage is reapplied to the microcomputer and the microcomputer clock counter has counted the above-described predetermined number of clock cycles without being reset.

Turning now to the drawings, FIGS. 1A and 1B show a schematic diagram of a power controller containing backup battery switching circuitry according to the present invention. As shown in FIG. 1A the power controller 10 receives a primary power source voltage from an external primary power source 11 connected to a primary power source input terminal 12 which is connected to a node labeled VCCI. The VCCI node is connected to the source of a p-channel transistor 14, the drain of which is connected to a power supply output terminal 16 of the integrated circuit chip. The power source output terminal 16 is shown connected to an external circuit 17 such as a static RAM. The VCCI node is also connected to the source of a second p-channel transistor 18. The power control circuit 10 receives a backup battery voltage from an external backup battery 19 connected to a backup battery input terminal 20. The backup battery input terminal 20 is connected to one end of a resistor 22, the other end of which is connected to the anode of a diode 24, the cathode of which is connected to one end of a second resistor 26, the other end of which forms the VCC and substrate voltage for the integrated circuit chip. This VCC voltage is connected to the drain of the p-channel transistor 18 and also connected to the source of another p-channel transistor 28, the drain of which is also connected to the power supply output terminal 16. The anode of the diode 24 is connected to one end of another resistor 30, the other end of which is connected to the negative inputs of three comparator circuits: a first comparator circuit 32, a second comparator circuit 34, and a third comparator circuit 36.

The VCCI node is connected to the positive input of the comparator 32 and to one end of a resistor 38, the other end of which is connected to the positive input of the comparator 34. The positive input of the comparator 34 is also connected to one end of a resistor 40, the other end of which is connected to the positive input of the comparator 36 and to one end of another resistor 42, the other end of which is connected to ground.

The VCCI node is also connected to one end of a resistor 44, the other end of which is connected to one end of another resistor 46, the other end of which is connected to the drain and gate of an n-channel transistor 48, the source of which is connected to ground. The drain and gate of the n-channel transistor 48 are connected to the B or bias inputs of the comparators 32 and 34 and to a first signal input of a transmission gate 50, the second signal input thereof connected to the B or bias input terminal of the comparator 36 and to the drain of an n-channel transistor 52. Connected in parallel with the resistor 44 is another transmission gate 54 having a p-channel gate terminal connected to a comparator bias control or CBC signal line 56. The CBC signal line 56 is also connected to the input of an inverter 58, to a p-channel gate terminal of the transmission gate 50, to the CBC input of the comparator 36, and to the gate of the n-channel transistor 52. The output of the inverter 58 forms a signal $\overline{CBC}$ which is connected to the n-channel gate terminal of the transmission gate 54, to the n-channel gate terminal of the transmission gate 50, and to the $\overline{CBC}$ input of the comparator 36.

The output of the comparator 32 is passed through two series inverters 60 and 62, the output of which is connected to the input of an OR gate 64 and to the input of a third inverter 63. The output of the inverter 63 is connected to the gates of the p-channel transistors 14 and 18. The output of the OR gate 64 is connected to the gate of the p-channel transistor 28.

The output of the comparator 34 is connected to the input of an inverter 66, the output of which forms a System Reset (SRESET) signal line 68.

The output of the comparator 36 is connected to the input of an interrupt logic block 70.

A second input to the OR gate 64 is connected to the output of a NAND gate 72 which is configured as an R-S latch with a second NAND gate 74. That is, one input of the NAND gate 72 is connected to the output of the NAND gate 74 and one input of the NAND gate 74 is connected to the output of the NAND gate 72. The two NAND gates 72 and 74 form a RAM Battery Power (RBP) latch 75. A second input of the NAND gate 74 is connected to the output of an inverter 76, the input of which is connected to a TIMEOUT signal line 78. A second input of the NAND gate 72 is connected to the output of a three-input NAND gate 80. The first input of a NAND gate 80 is connected to a Read Port (RP) signal line 82; the second input is connected to a TEST signal line 84; and the third input is connected to a Timed Access (TA) signal line 86.

The TA signal line 86 is connected to the output of a timed access logic circuit 88 which receives an input from a timed access register 90 which is connected to signal lines from an internal data bus 92.

Turning now to FIG. 1B, the SRESET signal line 68 is connected to the input of an OR gate 94 and also to the set input of a RESET latch 96 and to the input of another OR gate 98. The output of the OR gate 94 is connected to the reset input of a counter 100 which receives a clock signal on a SYSCLK line 102. The output of the counter 100 is connected to the TIMEOUT signal line 78. The TIMEOUT signal line 78 is also connected to the reset input of the RESET latch 96. The output of the RESET latch 96 is connected to the input of an inverter 104, the output of which is connected to the enable input of a timing and control circuit 106 inside the microcomputer. Also contained within the microcomputer is an instruction register 108 which provides a plurality of output signal lines including the RP signal on line 82, a counter reset signal on line 110 which is connected to a second input of the OR gate 94, and a test reset signal on a line 112 which is connected to a second input of the OR gate 98.

A logic signal input terminal 114 of the microcomputer is connected to an input buffer 116 and also to one end of a resistor 118, the other end of which is connected to the positive input of a comparator 120 and to one end of another resistor 122, the other end of which is connected to ground. The negative input of the comparator 120 is connected to one end of a resistor 124, the other end of which is connected to ground. The negative input of the comparator 120 is also connected to one end of another resistor 126, the other end of which is connected to VCC. The output of the comparator 120 is connected to the set input of a TEST mode latch 128. The output of the OR gate 198 is connected to a reset input of the TEST mode latch 128, and the output of the TEST mode 128 is connected to the TEST signal line 84.

In operation, and with reference now to FIG. 2, when the primary power source voltage at the primary power source input terminal 12 is greater than +4.75 volts, then the positive inputs of the comparators 32, 34, and 36 will all be greater than the negative inputs of these comparators; and the output of each of the comparators 32, 34, and 36 will be at a logical 1 level. This logical 1 level on the output of the comparator 32 produces a logical 1 level at the output of the inverter 62 which forces the output of the OR gate 64 to a logical 1 level which disables or makes nonconductive the p-channel transistor 28. This logical 1 level at the output of the inverter 62 is inverted by the inverter 63 to enable or make conductive the p-channel transistors 14 and 18 such that the primary power source voltage is coupled onto the power supply output terminal 16 and onto the VCC and substrate of the integrated circuit chip. Since the primary power source voltage is greater than the battery voltage under these conditions, the diode 24 is reverse biased isolating the battery voltage from VCC and the substrate of the integrated circuit chip.

The logical 1 level at the output of the comparator 34 is inverted by the inverter 66 to place a logical 0 level on the SRESET line 68. This logical 0 level disables the set input to the RESET latch 96 and, thus, does not affect the RESET latch 96, the OR gate 94, or the OR gate 98. Unless the instruction register 108 has issued a counter reset command on line 110, then the counter 100 will not be reset. The counter 100 places an output pulse on the TIMEOUT signal line 78 each time it counts a predetermined number of system clock cycles on the SYSCLK line 102. In the preferred embodiment this predetermined number is approximately 1700 counts which causes a pulse to occur on the timeout line 78 at approximately two millisecond intervals. Thus, under normal conditions, the RESET latch 96 is reset to form a logical 0 level at its output line which is inverted by the inverter 104 to enable the timing and control circuitry 106 of the microcomputer. These pulses on the timeout line 78 are also inverted by the inverter 76 to force the output of the NAND gate 74 to a logical 1 level which causes the output of the NAND gate 72 to go to a logical 0 level when the output of the NAND gate 80 is at a logical 1 level. The output of the NAND gate 80 will be a logical 1 level if either of the three inputs is at a logical 0 level. Since, as will be described below, at least one of the inputs of the NAND gate 80 is a logical 0 level during normal operations, the normal output of the NAND gate 72 is a logical 0 level.

Also under normal operations, the logic input pin 114 receives logical 0 or logical 1 voltage levels which are responded to by the input buffer 116. However, the logical 0 and logical 1 voltage levels are of insufficient voltage to cause the positive input of the comparator 120 to be greater than the negative input and the output of the comparator 120 is at a logical 0 level and does not set the TEST mode latch 128. The TEST mode latch 128 can be reset either by a test reset command from the instruction register 108 or when the SRESET line 68 goes to a logical 1 level. Therefore, under normal operations the output of the TEST mode latch 128 is a logical 0 level causing the TEST signal line 84 to be at a logical 0 level.

The RP signal line 82 becomes a logical 1 level when the instruction register 108 issues a Read Port command, and, therefore, the RP signal line 82 is usually at a logical 0 level.

The timed access register 90 stores two predetermined data words and compares these words to data received from the internal data bus 92 to determine both if the predetermined data words have been received and the sequence in which they are received. A first timer inside the timed access logic 88 is initiated after receipt of the first predetermined data word during which time the second predetermined data word must be received from the internal data bus 92. If the second predetermined data word is received during the duration of the first timer, a second timer inside the timed access logic 88 is initiated. The second timer has a duration during which the TA line 86 is activated. At the end of the second timer's duration, the TA signal line 86 is switched back to a logical 0 level. This TA signal line 86 is usually at a logical 0 level under normal operations of the microcomputer.

The logical 1 level at the output of the comparator 36 does not affect the interrupt logic block 70, that is, does not cause an interrupt to occur in the microcomputer.

Also under normal conditions, the CBC signal on line 56 is a logical 0 level which makes conductive the transmission gates 50 and 54 and allows the comparator 36 to operate in the same manner as the comparators 32 and 34. Under these conditions the resistor 46 and the n-channel transistor 48 form a current source which is mirrored into the comparators 32, 34, and 36 as a bias current control voltage, and the comparators 32, 34, and 36 under these conditions have a slew rate sufficient to track the changes in the primary power source voltage.

When the CBC signal on line 56 becomes a logical 1 level, such as when the microcomputer is in a stop mode, then the transmission gates 50 and 54 are nonconductive which places a resistor 44 in series with the resistor 46 to reduce the amount of current flowing through the n-channel transistor 48 which is, in turn, mirrored into the bias current of the comparators 32 and 34, thereby reducing the amount of current drawn in each of the comparators 32 and 34 and also reducing the slew rate of these two comparators. The nonconductive state of the transmission gate 50 combined with the conductive state of the n-channel transistor 52 pulls the bias input of the comparator 36 to ground potential. Also the logical 1 level on the CBC signal line 56 and the logical 0 level on the $\overline{CBC}$ line causes the comparator 36 to cease operating as a comparator and to force a logical 1 level at the output of the comparator 36. Under these conditions the output of the comparator 36 is always a logical 1 level regardless of the voltage from the primary power source 11 and, therefore, does not cause any interrupts to be generated in the interrupt logic block 70.

When the CBC signal line 56 is a logical 0 level and when the primary power source voltage drops below +4.75 volts as indicated by number 130 in FIG. 2, the output of the comparator 36 switches from a logical 1 level to a logical 0 level which causes the interrupt logic circuitry 70 to interrupt the microcomputer and to cause the microcomputer to vector to a specific address in the instruction memory to advantageously prepare the microcomputer for a primary power source failure condition by storing in nonvolatile memory the data in the registers of the microcomputer. Thus, when the primary power source is reapplied to the microcomputer, the state of the microcomputer can be restored and processing continued from the point of the power interruption.

As the primary source voltage decreases further to +4.5 volts as shown by number 132 in FIG. 2, the output of the comparator 34 switches to a logical 0 level which forces the SRESET signal line 68 to a logical 1 level. This logical 1 level on line 68 forces the output of the RESET latch 96 to a logical 1 level which forces the output of the inverter 104 to a logical 0 level which disables the timing and control circuitry 106 of the microcomputer. This logical 1 level on the SRESET signal line 68 also causes the TEST mode latch 128 to be reset which places a logical 0 level on the TEST signal line 84. Finally, the logical 1 level on the SRESET signal line 68 forces the counter 100 into a reset condition which causes the output on the TIMEOUT signal line 78 to be a logical 0 level at all times.

When the primary power source voltage drops below the battery voltage as shown as number 134 in FIG. 2, then the output of the comparator 32 switches to a logical 0 level which provides a logical 0 level at the output of the inverter 62. The output of the NAND gate 72 will be a logical 0 level unless the special sequence of events described below with respect to FIG. 3 is performed. Assuming the sequence of events has not been performed, the output of the OR gate 64 will be a logical 0 level which in turn will enable the p-channel transistors 28 to provide battery power to the power supply output terminal 16. The logical 0 level at the output of the inverter 62 is inverted by the inverter 63 to disable the p-channel transistors 14 and 18. Under these conditions the diode 24 will become forward biased and the battery voltage will provide the VCC and substrate voltage for the integrated circuit chip.

As the primary power source is reapplied, the outputs of the comparators 32, 34, and 36 will switch in the reverse order as when the primary power source voltage was falling from +5 volts to ground. That is, the output of the comparator 32 will switch to a logical 1 level when the primary power source voltage goes above the backup battery voltage which will couple the primary power source input terminal 12 to the power supply output terminal 16 and to the VCC and substrate of the integrated circuit chip. As the primary power source voltage increases above +4.5 volts, the output of the comparator 34 will become a logical 1 level which in turn will cause the SRESET signal line 68 to go to a logical 0 level which will disable the reset input to the counter 100 and allow the counter 100 to again count the system clock cycles and generate periodic pulses on the TIMEOUT signal line 78. These periodic pulses on the TIMEOUT signal line 78 will reset the RESET latch 96 to place a logical 1 level at the output of the inverter 104 to enable the timing and control circuitry 106. The logical 0 level on the SRESET signal line 68 will also disable the reset into the TEST mode latch 128 to allow the output of the TEST mode latch 128 to go to a logical 1 level when the proper signal is applied at the logic input pin 114 as described below.

As the primary power source voltage increases above +4.75 volts, the output of the comparator 36 will switch to a logical 1 level which will not cause an interrupt to occur in the interrupt logic block 70.

When it is desired to isolate the power supply output terminal 16 from the backup battery input terminal 20, then the steps shown in FIG. 3 are performed. More specifically, with the primary power source voltage above 4.75 volts, a voltage of between 12 and 15 volts is applied (step 310) to the logic input terminal 114. This voltage is divided by the resistors 118 and 122 to provide a voltage at the positive input of the comparator 120 which is greater than the voltage at the negative input of the comparator 120 formed by the division of the VCC voltage by the resistors 126 and 124. When the positive input is greater than the negative input of the comparator 120, the logical 1 level at the output of the comparator sets the TEST mode latch 128 and causes a logical 1 level to be on the TEST signal line 84. Next, (step 320), the instruction register executes a counter reset command on line 110 to reset the counter 100 to allow time for the RBP latch 75 to be switched before a positive pulse occurs on the TIMEOUT signal line 78. Next, (step 330), the microcomputer places the proper data words on the internal data bus 92 to cause the timed access logic 88 to initiate the first and second timer and thereby place a logical 1 level on the TA signal line 86 for the duration of the second timer. Next, (step 340), microcomputer causes the instruction register 108 to execute a Read Port command which places a logical 1 level on the RP signal line 82. At this time all three inputs to the NAND gate 80 are at a logical 1 level which causes the output of the NAND gate 80 to go to a logical 0 level which causes the output of the NAND gate 72 to go to a logical 1 level. Next, the primary power source voltage must be dropped below 4.5 volts before a pulse occurs on a TIMEOUT signal line 78. Alternatively, the system clock driving the microcomputer could also be inhibited which would stop the counter 100 from placing a pulse on the TIMEOUT signal line 78.

Under these conditions when the primary power source voltage is removed, the output of the NAND gate 72, being at a logical 1 level, causes the output of the OR gate 64 to be at a logical 1 level which disables the p-channel transistor 28 and thereby isolates the power supply output terminal 16 from the backup battery voltage.

When the primary power source voltage is reapplied after this sequence of events which isolates the power supply output terminal 16 from the backup battery voltage, the timing pulses on the TIMEOUT signal line 78 will cause the RBP latch to reset so that when the primary power source voltage is interrupted again, the power supply output terminal 16 will be powered by the backup battery 19 unless the sequence of events shown in FIG. 3 is repeated.

In an alternative embodiment, a portion of the microcomputer itself may be powered from the voltage to the power supply output terminal 16 on a line 136 shown in FIG. 1A. Thus, this portion of the microcomputer would also not be powered when backup battery voltage was not applied to the power supply output terminal 16.

Thus, there has been described backup battery switching circuitry which selectively couples a backup battery voltage to a static RAM such that the static RAM can be powered from the backup battery voltage in the absence of a primary power source voltage when it is desired to preserve the data stored in the static RAM, and can be isolated from the backup battery voltage when it is desired to reduce the power drain on the backup battery caused by the static RAM.

Although the invention has been described in part by making detailed reference to a certain specific embodiment, such detail is intended to be, and will be understood to be, instructional rather than restrictive. It will be appreciated by those skilled in the art that many variations may be made in the structure and mode of operation without departing from the spirit and scope of the invention, as disclosed in the teachings contained herein.

What is claimed is:

1. In a microcomputer or microprocessor having a first input terminal for coupling to a primary power source, a second input terminal for coupling to a backup battery, an output terminal for providing power supply voltage to an external circuit, and a comparison means for comparing voltage at said first input terminal to the voltage at said second input terminal, the improvement comprising:
   (a) a latch circuit having an output terminal which switches to a first logic state when said microcomputer or microprocessor has issued a sequence of predetermined commands, and switches to a second logic state when a counter in said microcomputer or microprocessor counts a predetermined number of clock cycles of said microcomputer or microprocessor after said counter has been reset; and
   (b) switching means for operatively connecting said backup battery voltage to said output terminal when said voltage at said first input terminal is less than the voltage at said second input terminal and said output of said latch circuit is in said first logic state, and for isolating said second input terminal from said output terminal when said voltage at said first input terminal is greater than said voltage at said second input terminal or said output of said latch circuit is in said second logic state.

2. The improvement set forth in claim 1 further including means for preventing said latch circuit from switching to said first logic state unless a predetermined voltage level is applied to a logic input terminal of said microcomputer or microprocessor, said predetermined voltage level being other than a logical 1 voltage level or a logical 0 voltage level.

3. A method for selectively coupling a backup battery input terminal of a microcomputer or a microprocessor, which is also connected to receive a primary power source, to a power supply output terminal of said microcomputer or microprocessor, comprising the steps of:
   comparing the voltage of said backup battery input to the voltage of said primary power source;
   coupling said backup battery input terminal to said power supply output terminal
   IF said comparing step indicates that the voltage of said backup battery input is greater than the voltage from a primary power source for said microcomputer or microprocessor,
   AND IF a latch circuit is in a second logic state,
      said latch circuit being switchable to a first logic state when said microcomputer or microprocessor issues a sequence of predetermined commands, and
      said latch circuit being switchable to said second state when a counter circuit in said microcomputer or microprocessor counts a predetermined number of clock cycles of said microcomputer or microprocessor after said counter has been reset; and
   isolating said backup battery input terminal from said power supply output terminal when said backup battery voltage is less than said primary power source voltage or said latch circuit is in said second state.

4. A microprocessor, comprising:
   a first power input connection for receiving an external power supply voltage, a second power input connection for receiving a backup battery supply voltage, and a power output connection;
   a comparator connection to compare the potential of said first power input with the potential of said second power input, and to provide a corresponding output;
   a counter circuit;
   a latch circuit which switches to a second logic state when a counter in said microcomputer or microprocessor counts a predetermined number of clock cycles of said microcomputer or microprocessor after said counter has been reset, and which can also be switched to a first logic state; and
   a switching circuit which
      connects said backup battery voltage to said output terminal when said voltage at said first input terminal is less than the voltage at said second input terminal and said output of said latch circuit is in said first logic state, and
      disconnects second input terminal from said output terminal when said voltage at said first input terminal is greater than said voltage at said second input terminal OR said output of said latch circuit is in said second logic state.

* * * * *